United States Patent
Zomer et al.

(10) Patent No.: US 8,526,572 B2
(45) Date of Patent: Sep. 3, 2013

(54) AMPLIFYING OPTICAL CAVITY OF THE FABRY-PEROT TYPE

(75) Inventors: Fabian Zomer, Gif-sur-Yvette (FR); Richard Cizeron, Gif-sur-Yvette (FR)

(73) Assignee: Centre National de la Recherche Scientifique—CNRS, Paris (FR)

(*) Notice: Subject to any disclaimer, the term of this patent is extended or adjusted under 35 U.S.C. 154(b) by 168 days.

(21) Appl. No.: 13/062,336

(22) PCT Filed: Sep. 4, 2009

(86) PCT No.: PCT/FR2009/001065
§ 371 (c)(1), (2), (4) Date: Aug. 4, 2011

(87) PCT Pub. No.: WO2010/026317
PCT Pub. Date: Mar. 11, 2010

(65) Prior Publication Data
US 2011/0280375 A1    Nov. 17, 2011

(30) Foreign Application Priority Data
Sep. 5, 2008  (FR) .................................. 08 55987

(51) Int. Cl.
*G21K 1/06*  (2006.01)
(52) U.S. Cl.
USPC ............................................ 378/84; 378/145
(58) Field of Classification Search
USPC ...... 378/119, 84–85, 145, 146, 147; 356/454
See application file for complete search history.

(56) References Cited

U.S. PATENT DOCUMENTS

| | | | |
|---|---|---|---|
| 4,468,775 A | 8/1984 | Meyer et al. | |
| 4,813,774 A | 3/1989 | Dorschner et al. | |
| 4,815,080 A | 3/1989 | Chesnoy et al. | |
| 5,088,815 A | 2/1992 | Garnier et al. | |
| 6,674,782 B2 | 1/2004 | Roosen et al. | |

(Continued)

OTHER PUBLICATIONS

English Translation of the International Preliminary Report on Patentability for PCT/FR2009/001065, issued Apr. 5, 2011 (8 pages), incorporating the English Translation of the Written Opinion of the ISA.

(Continued)

*Primary Examiner* — Hoon Song
(74) *Attorney, Agent, or Firm* — Harness, Dickey & Pierce, P.L.C.

(57) ABSTRACT

The disclosure relates to an amplifying optical cavity of the Fabry-Perot type that can be used in combination with a high-rate picosecond pumped laser for generating monochromatic X-rays. The disclosure relates to an amplifying optical cavity of the Fabry-Perot type that can be used for obtaining a strongly focused pumped laser beam having a high stability at the average power $P_{MOY}$. The disclosure more particularly relates to an amplifying optical cavity of the Fabry-Perot type for generating monochromatic X-rays by the Compton reaction between a high-rate picosecond pumped laser beam and a synchronised electron beam, the cavity including a closed enclosure that can be placed under a vacuum and through which extends an electron beam tube, the enclosure including a laser beam input means, a means for maintaining and positioning two planar optical reflectors, and a means for maintaining and positioning two spherical optical reflectors capable of focusing the laser beam at an interaction point with the electron beam. The means for maintaining and positioning the optical reflectors are arranged so that said optical reflectors substantially define the vertexes of a tetrahedron.

10 Claims, 4 Drawing Sheets

(56) References Cited

U.S. PATENT DOCUMENTS

| | | |
|---|---|---|
| 6,768,097 B1 | 7/2004 | Viktorovitch et al. |
| 6,943,384 B2 | 9/2005 | Viktorovitch et al. |
| 7,277,526 B2 | 10/2007 | Rifkin et al. |
| 7,310,408 B2 | 12/2007 | Filkins et al. |
| 7,391,850 B2 | 6/2008 | Kaertner et al. |
| 7,474,733 B1 * | 1/2009 | Yamamoto ............... 378/84 |
| 7,519,092 B2 | 4/2009 | Dubreuil et al. |
| 7,657,146 B2 | 2/2010 | Laval et al. |
| 7,751,117 B2 | 7/2010 | Tignon |
| 7,768,691 B2 | 8/2010 | Nerin et al. |
| 7,852,488 B2 | 12/2010 | Devos et al. |
| 7,887,203 B2 | 2/2011 | Robert |
| 2009/0060134 A1 * | 3/2009 | Fuller ............... 378/85 |
| 2009/0252183 A1 | 10/2009 | Dubreuil et al. |
| 2009/0310965 A1 | 12/2009 | Merolla et al. |

OTHER PUBLICATIONS

Zomer, F.: "Polarisation Effects in 4 Mirrors Cavities" Posipol 2008 Hiroshima.

Honda Y et al: "Stabilization of a Non-Planar Optical Cavity Using Its Polarization Property", Optics Communications, North-Holland Publishing Co. Amsterdam, NL, vol. 282, No. 15, Aug. 1, 2009, pp. 3108-3112, XPO26186015 ISSN: 0030-4018, p. 3108, line 1, figure 1; p. 3111, line 4.

XP002570159; International Conference Center, Hiroshima, Japan, Jun. 16, 2008, obtained at http://home.hiroshima-u.ac.jp/posipol/presentations/June17/FZ_polar_4_miroirs.ppt; pp. 2, 9, 15.

* cited by examiner

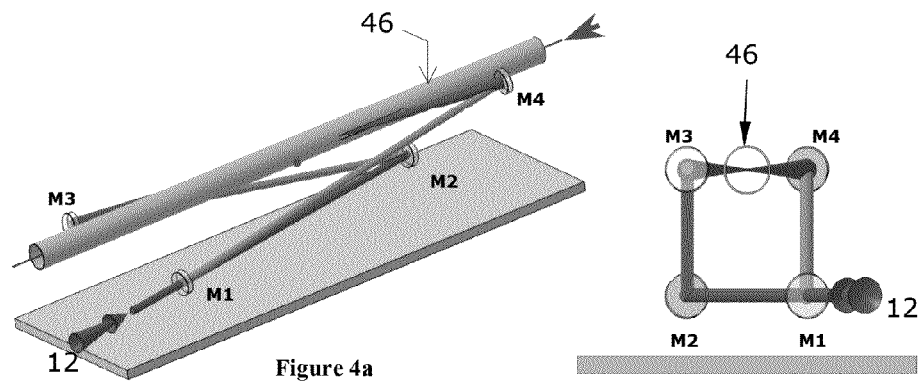
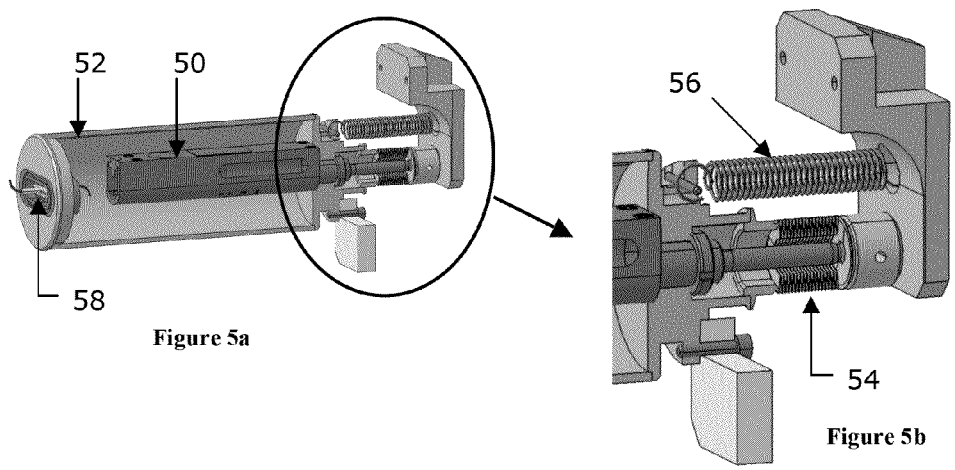
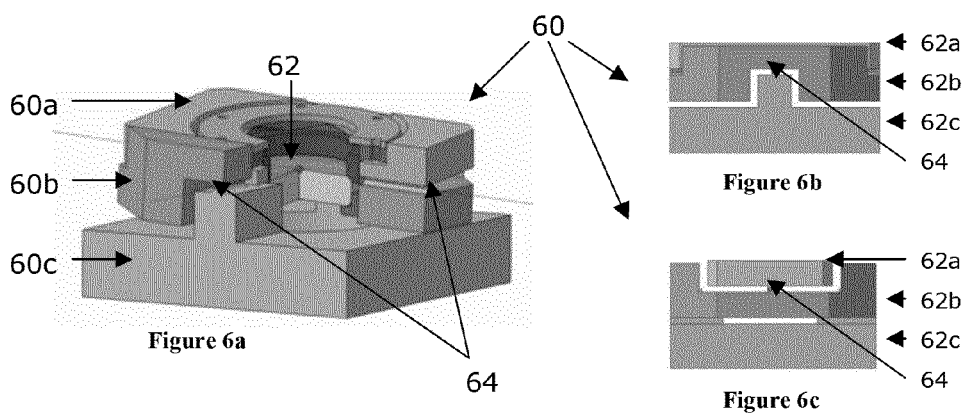

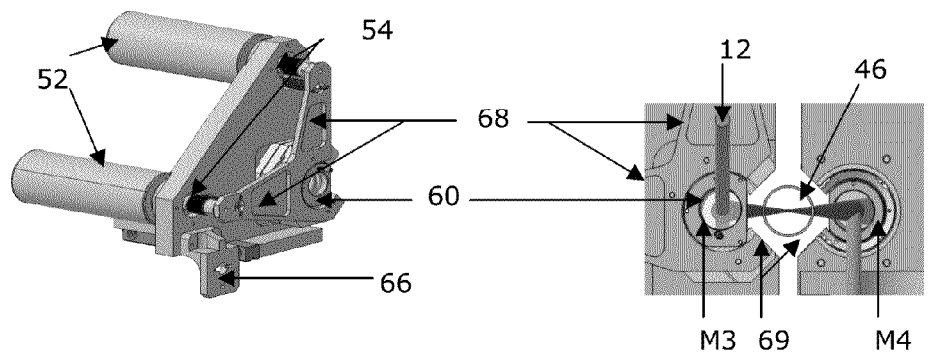
Figure 7a
Figure 7b
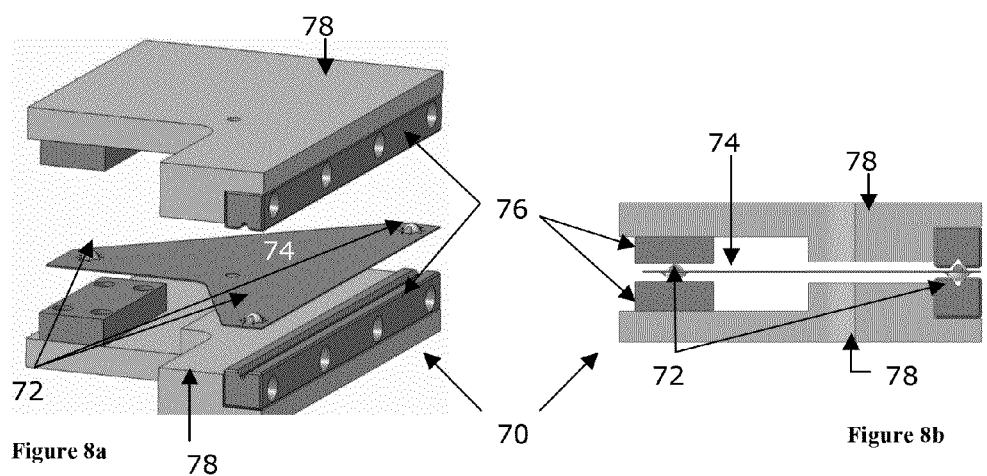
Figure 8a
Figure 8b
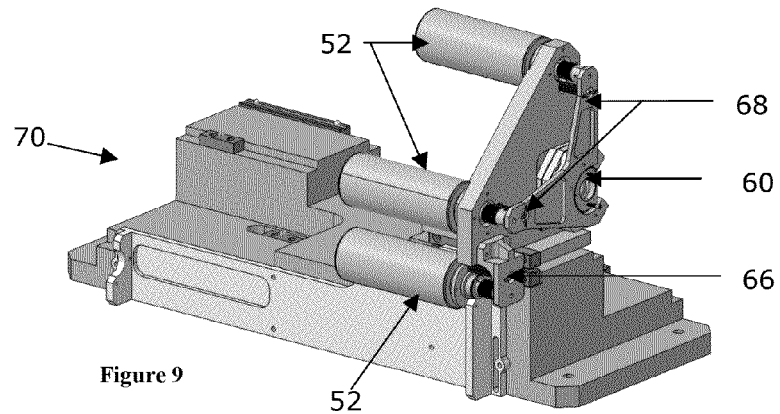
Figure 9

AMPLIFYING OPTICAL CAVITY OF THE FABRY-PEROT TYPE

CROSS-REFERENCE TO RELATED APPLICATIONS

This application is a National Phase Entry of International Application No. PCT/FR2009/001065, filed on Sep. 4, 2009, which claims priority to French Patent Application Serial No. 08/55987, filed on Sep. 5, 2008, both of which are incorporated by reference herein.

TECHNICAL FIELD OF THE INVENTION

The invention relates to an amplifying optical cavity of the FABRY-PEROT type which can be used in combination with a high-rate picoseconds pulsed laser for producing monochromatic X rays. The present invention relates to the technical field of amplifying optical cavities for producing monochromatic X rays through a COMPTON reaction, that is, through the interaction of electron packets propagated in a vacuum tube of an accelerator with a pulsed laser signal feedback-controlled on an ultra-fine optical resonator.

The aimed applications are numerous since they require a source of high-flux monochromatic X-rays that is sufficiently compact for use in local study centers rather than in specialized test centers having bulky equipments. For example, such a device may be employed in the medical field, more particularly in resonant radiotherapy, high contrast radiography or angiography. There also exist other application fields in pharmacology in the frame of the analysis of protein and molecule structures, in nuclear industry in the frame of waste retreatment through non-destructive container analysis, in particle physics in the frame of the implementation of polarized positron beam sources, etc.

BACKGROUND

It is known from the prior art various methods for increasing the power of a laser source. The most conventional method among these consists in using a doped-fiber amplification cascade, making it possible to highly increase the peak power $P_{peak}$ of the laser signal. Nevertheless, with such a method it is not possible to obtain a sufficient mean power $P_{mean}$ for the aimed applications since it does not generally exceed a hundred Watts.

Another method consists in amplifying the laser signal in an optical resonator, or amplifying cavity, of the FABRY-PEROT type. In fact, in order to increase the number of photons produced through the COMPTON effect when the electron beam and the laser beam cross each other, it is necessary to reduce to the maximum the transverse and longitudinal dimensions of both beams. Nevertheless, in order to reduce the minimal transverse dimension of a laser beam within a FABRY-PEROT cavity composed of spherical mirrors, it is necessary that the distance between these two mirrors be as close as possible to twice the curvature radius of the mirrors.

Nevertheless, such a cavity being instable, it cannot be used in the frame of a real application. This is the reason why many devices for producing monochromatic X-rays generated through the COMPTON effect, such as those illustrated in OPTICS LETTER review, vol. 32, No. 19, Oct. 1, 2007, as well as in patent document No US 2008002813, use an amplifying cavity of the FABRY-PEROT type having four coplanar mirrors out of which two are spherical. The minimal transverse dimension may then be reduced of about tens of microns while exhibiting a good mechanical stability.

Meanwhile, the eigen states of polarization of a cavity with four coplanar mirrors have been calculated and it has been found that when the fineness of the cavity is high, that is, when the cavity gain is higher than about 1000, these eigen states vary strongly depending on inevitable mirror misalignments and vibrations. The polarization of the laser beam injected in the cavity being fixed, such variations lead not only to a variation of the intra-cavity polarization but also to an intra-cavity power variation. These power variations are detrimental in that the mean intra-cavity power $P_{mean}$ is reduced.

Further, the existing devices also exhibit defects relating to the laser orientation precision that determines in part, the transverse dimensions of the laser beam. More particularly, the combination of mechanical parts used to orient the optical reflectors within the cavity and in vacuum experimental conditions lead to clearances that alter the cavity fineness.

Another problem raised by these systems relates to the use of motors in a vacuum medium. In fact, standard motors commercially available as being UHV compatible do not totally satisfy the requirements of ultrahigh vacuum such as required when using an optical resonator, in particular, owing to the high non pollution restrictions associated to the integration on the accelerator. In commercially available products, the hinges of the optical mounts are made with very weak or prestressed clearances, thus, greased to guarantee a precise positioning with no seizing risk. Two reasons exclude this type of hinging in vacuum conditions. On one hand, the use of grease is prohibited, and, on the other hand, between contact surfaces of a same nature, are generated microbonding phenomena which make their relative sliding impossible, particularly under vacuum conditions where the parts are very clean so as to satisfy the UHV conditions. These problems become even more essential as the number of motors required for the settings of the cavity considerably increases the level of pollution.

SUMMARY

The aim of the present invention is to overcome the drawbacks of the prior art thanks to an amplifying optical cavity of the FABRY-PEROT type making it possible to obtain a highly focused pulsed laser ray and exhibiting a strong mean power $P_{mean}$ stability. Also, the aim of the invention is to provide an amplifying optical cavity exhibiting a strong setting sensitivity, that is, a laser beam having reduced transverse dimensions, generating no noises within the vacuum enclosure. Moreover, the aim of the invention is to implement a system for producing high-flux monochromatic X-rays through the COMPTON effect, which is both compact and powerful.

In order to stabilize the polarization of the eigen mode of the amplifying cavity, and thus, the intra-cavity power, the invention proposes the implementation of a configuration of non planar mirrors, and more particularly of a substantially tetrahedron shape. More specifically, the object of the invention is an amplifying optical cavity of the FABRY-PEROT type for producing monochromatic X-rays through the COMPTON reaction of a high-rate picoseconds pulsed laser beam with a synchronized electron beam, the cavity having a closed enclosure capable of being vacuumed, traversed by an electron beam tube, the enclosure including laser beam input means, maintaining and positioning means for maintaining and positioning two plane optical reflectors, maintaining and positioning means for maintaining and positioning two spherical optical reflectors capable of focusing the laser beam at the point of interaction with the electron beam, wherein the optical reflector maintaining and positioning means are arranged such that said optical reflectors substantially define the vertexes of a tetrahedron.

Such a tetrahedron configuration makes it possible to obtain a high-fineness beam while obtaining interesting stability features. The eigen modes of such a cavity are called "generalized astigmatic" modes, that is, the intensity profile is elliptic and the natural axes thereof rotate during the propagation, which slightly affects the luminosity geometric factors of the electron-laser interaction compared to the "standard astigmatic" modes of a four-mirror planar cavity. The astigmatism, that is, the ratio of the beam size along the major and minor axis of the ellipse, also decreases compared to an equivalent planar configuration.

According to an embodiment, the means for maintaining and positioning both spherical optical reflectors have two complementary clearances, arranged so as to define a bay for the passage of the electron beam tube. The implementation of two additional complementary clearances in the spherical reflector maintaining and positioning means makes it possible to arrange the spherical mirrors as close as possible to the electron beam and thus to obtain the narrowest angle at the point of collision between the laser and the electron beam. Advantageously, the means for maintaining and positioning at least one optical reflector comprise a member for orienting said reflector made from a single mechanical piece, composed of at least three distinct portions, movable relative to each other by means of a flexible hinge.

The use of a mirror orienting member made from a single piece having flexible hinges makes it possible to perform frictionless and clearance-free relative movements. Such a configuration is particularly adapted to ensure a precise positioning in ultrahigh vacuum.

Preferably, the three distinct portions of the orienting member are movable around two rotation axes converging at one point and substantially confounded with the center of the optical reflector. The fact that the three distinct portions of the orienting member are movable around two converging rotation axes and substantially confounded with the optical center of the reflector eases the adjustment of the reflector orientation and makes it possible to obtain a precise orientation.

Advantageously, the optical reflector maintaining and positioning means are actuated by linear electrical motors encapsulated within a sealed enclosure made of stainless steel extended by a bellows. The encapsulation of the linear motors within a sealed enclosure extended by a bellows makes it possible to clear the non pollution restrictions relating to the accelerator integration. On the other hand, the use of grease between the moving parts becomes again possible and the choice of the motors is no longer determined by the ability to operate under vacuum, but depends essentially on the mechanical and positioning precision characteristics. This also makes it possible to independently adjust the orientations and the position of the mirrors along a z-axis.

Preferably, the linear electric motors are maintained in permanent contact with regard to the optical reflector maintaining and positioning means by means of a spring element generating a return force. The use of a spring element makes it possible to counteract the vacuum force and to hold a permanent point contact between the motor shaft and the part to be translated.

Advantageously, the means for maintaining and positioning at least one optical reflector have a z-axis translation table, the translation table supporting two linear motors capable of actuating the reflector orienting member. The use of a translation table supporting the linear motors used for moving the orienting member makes it possible to improve the precision of the device.

Preferably, the means for maintaining and positioning at least one optical reflector comprise a piezoelectric actuator oriented along the direction of the reflector optical axis and maintained in position via a spring ring. With the piezoelectric actuator mounted on the mirror support element it is possible to adapt the length of the optical path of the laser beam to a few nanometers at frequencies of few hundreds of Hertz. It makes it possible to implement a feedback control between the length of the round trip in the cavity and the distance between two successive electron packets. Moreover, the use of a spring ring to maintain this piezoelectric actuator makes it possible, when the clamping is at its maximum, to apply on the mirror a given holding stress, relating to the geometry of the resilient parts and to the mirror thickness.

Advantageously, all the optical reflector maintaining and positioning means are positioned on a main support, said main support being the only piece contacting the closed enclosure. Also, with this construction it is possible to isolate the cavity from external vibrations by restricting the contact points with the enclosure. According to another aspect, the invention also relates to a system for producing monochromatic X-rays through a COMPTON reaction, including an optical cavity such as described above.

BRIEF DESCRIPTION OF THE DRAWINGS

Other characteristics and advantages of the invention will be more apparent through the reading of detailed exemplary embodiments, with reference to the accompanying figures in which, respectively:

FIGS. 4a and 4b are two, perspective and front views, of the plane and spherical mirrors, of the laser beam and of the electron beam tube propagating within an optical cavity according to the invention;

FIGS. 5a and 5b are two, cross-sectional and perspective, views of an actuator for moving the means for maintaining and positioning mirrors M1 to M4 of an optical cavity of the invention;

FIGS. 6a, 6b and 6c are a perspective view, a right view and a left view of a mirror orienting member belonging to an optical cavity maintaining and positioning means according to the invention;

FIGS. 7a and 7b are a perspective view of a carriage supporting the mirror orienting member along with a front view of two members for orienting spherical mirrors M3 and M4 belonging to an optical cavity according to the invention;

FIGS. 8a and 8b are two, perspective and front, views of a translation table belonging to an optical cavity according to the invention;

FIG. 9 is a perspective view of a translation table 70 mounted on a main support 80 belonging to an optical cavity according to the invention.

DETAILED DESCRIPTION OF AN EMBODIMENT

General Description

Figure 1:
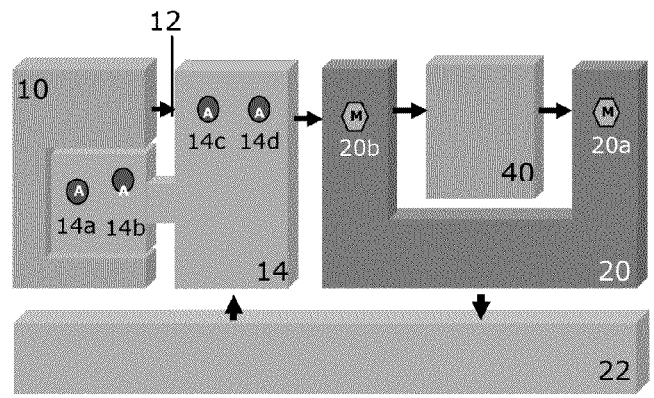
FIG. 1 is a functional flow diagram of a system for producing monochromatic X-rays through a COMPTON reaction according to the invention.

FIG. 1 represents a functional flow diagram of the system for producing monochromatic X-rays through a COMPTON reaction according to the invention. A pulsed laser cavity 10 produces a pulsed laser beam 12. This laser beam 12 is advantageously controlled by two types of actuators gathered within an actuator and associated driving electronic module 14. The pulsed laser cavity 10 have a wavelength of 800 nm, that is, in the infrared domain, a pulse energy of 10 nJ and a mean power of 1 W. It comprises a laser producing a continuous beam of 6 W used for pumping a Titanium:Sapphire crystal located within an optical resonator whose 2 m length between the mirrors thereof determines the repetition frequency of 76 MHz of the emitted pulses.

A first type of actuators makes it possible to feedback-control the length of the pulsed laser cavity 10 to the length of an amplifying optical cavity of the FABRY-PEROT type 40 (described later on). This first type of actuators is composed of a piezoelectric actuator 14a along with a linear translation motor 14b both being physically integrated inside the pulsed laser cavity 10. The piezoelectric actuator 14a, driven by associated electronics, makes it possible to change the relative deviation ΔL between the length of the resonator cavity and that of the FABRY-PEROT cavity 40, in the frequency band 0-40 KHz, with about 100 picometers to 1 micrometer dynamics. The linear translation motor 14b makes it possible to change the relative deviation ΔL between the length of the resonator cavity and that of the FABRY-PEROT cavity 40, in the 0-10 KHz band with about 100 nanometers to a plurality of millimeters dynamics. The driving electronics of this linear translation motor 14b is provided with the motor.

A second type of actuators makes it possible to correct phase Δø between the electromagnetic field and its envelope in the FABRY-PEROT cavity 40. They include an optical pumping modulator 14c and a frequency modulator 14d, both of which being located outside the pulsed laser cavity 10. Both of the optical pumping modulator 14c and the frequency modulator 14d are advantageously acoustic-optical modulators which respectively allow the modulation of the optical pumping power and the offsetting the laser optical spectrum so as to change the relative phase Δø between the electromagnetic field and its envelope in the FABRY-PEROT cavity.

Once the feedback control performed, the power inside the FABRY-PEROT cavity 40 is amplified by a coefficient which depends on the Fineness of the mirrors contained therein. The feedback control requires a plurality of specific measurements, gathered within a measurement and associated interface electronic module 20 which is composed of:

One element 20a, for independent transmission measurement, called Front End Transmission which processes the optical signal transmitted at the output of the FABRY-PEROT cavity 40.

One element 20b for a more complex reflection measurement, called Front-End reflection which processes the optical signal reflected at the input of the FABRY-PEROT cavity 40 though the use of a particular so called Pound-Drever-Hall technique.

This technique is particularly continuously described in the publication R W. Dreyer et al., laser phase and frequency stabilization using an optical resonator. Appl. Phys. B 31, 97-105 (1983), and in pulsed mode in publication R. J. Jones and J C. Diels, Stabilisation of femtosecond lasers for optical metrology and direct optical to radio frequency synthesis. Phys. Rev. Lett. 86, 3288-3291 (2001). A feedback control electronic system 22 acquires and converts numerically analogical signals from the Front-Ends in transmission and in reception, performs real time feedback-control calculations and outputs the driving instructions transmitted to actuators 14a and 14d so as to maintain the FABRY-PEROT cavity 40 resonating.

Description of the Optical Portion

Figure 2:
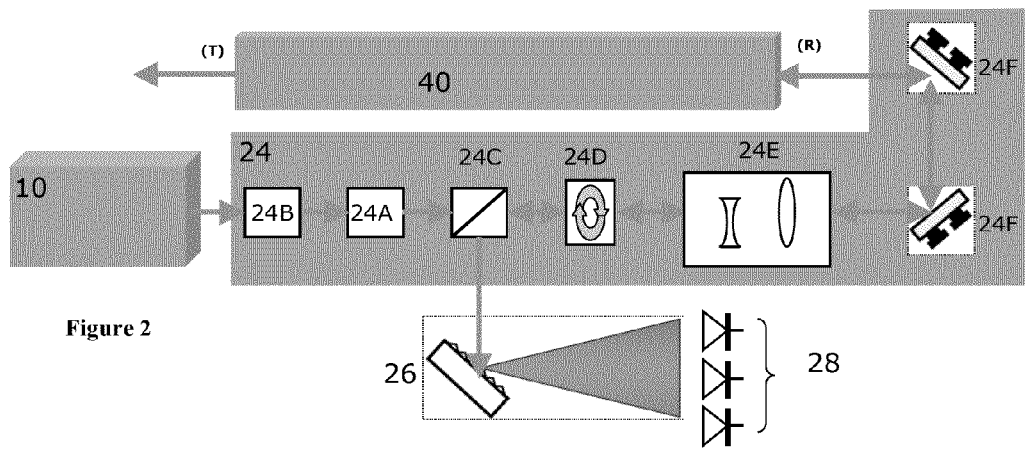
FIG. 2 is a general flow diagram of the optical portion of the system according to the invention.

FIG. 2 represents a general flow diagram of the optical portion of the system used to accumulate, inside the FABRY-PEROT optical cavity 40, the optical energy of the short laser pulses, until it reaches a level of plural micro-Joules per pulse, with a repetition frequency of about a hundred MHz. To this end, a laser pulse train from the pulsed laser cavity 10 is feedback-controlled on a FABRY-PEROT optical cavity 40 by the so-called Pound-Drever-Hall technique so as to have image electrical amounts of the optical features of the controlled beam.

Advantageously, the optical portion of the system is composed of:

A picoseconds pulse width laser with a repetition rate of 76 MHz, including actuators. There is no limitation as to the repetition frequency within an interval of a few MHz to some GHz. Likewise, the time period may be selected within a time interval from a few femtoseconds to some tens of picoseconds;

An amplifying optical cavity of the FABRY-PEROT type 40 to be described in more detail later;

Optical elements 24 allowing the transport of the laser beam from the pulsed laser cavity 10 to FABRY-PEROT cavity 40; and A diffraction array 26 making it possible to separate the parameters to be feedback controlled.

A picoseconds pulse train is emitted by the Titanium:Sapphire laser (Ti:Sa) operating in a mode locking operating condition. The energy of a pulse is of about 10 nJ, the pulse repetition frequency of 76 MHz. The pulse train is sent on an electro-optical modulator 24a which generates two lateral bands around each frequency comb line of the laser that are employed by the so-called Pound-Drever-Hall technique to obtain the error signals. There is no restriction as to the choice of the wavelength provided that the oscillator is of the passive mode locked type.

A Faraday isolator 24b shields the pulsed laser of the ray reflected by the FABRY-PEROT cavity 40 and the beam separator 24c sends the beam to the array 26. The beam separator 24c in association with a quarter wave plate 24d form an assembly that separates the ray reflected by the FABRY-PEROT cavity 40. A Galilean telescope 24e is used to perform a positional and diametrical tuning of the laser beam parameters with the mode parameters of the cavity. Moreover, two external mirrors 24f align the cavity mode and laser beam axis directions.

The laser beam 12 reflected by the cavity is redirected by the beam separator 24c on the diffraction array 26 thus allowing the scattering of the different spectral components in separate spatial directions. The signals of a plurality of photodiodes 28 acquire the different portions of the spectrum and are used for producing error signals transmitted to the electronic feedback control system 22.

Description of the Fabry Perot Type Optical Cavity

Figure 3:
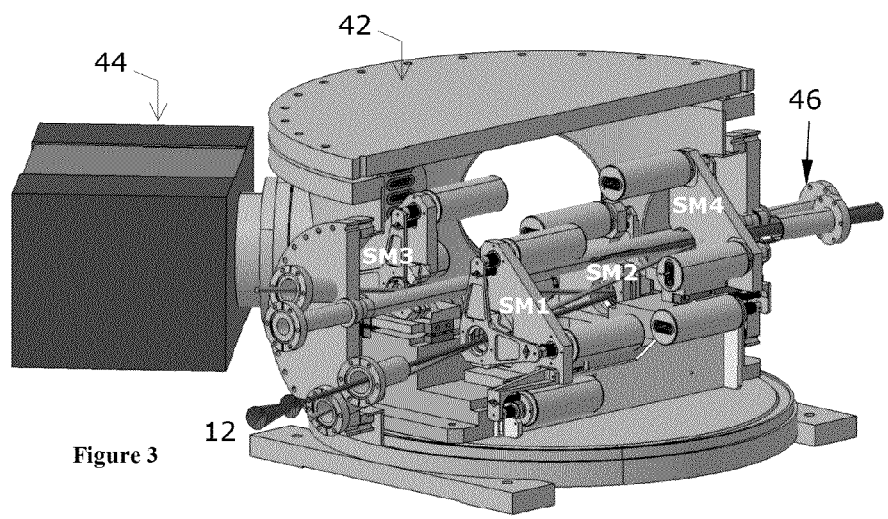
FIG. 3 is a perspective view of an amplifying optical cavity of a FABRY-PEROT type according to the invention, the sealed enclosure of which being partially illustrated.

FIG. 3 represents a perspective view of an amplifying optical cavity 40 of the FABRY-PEROT type according to the invention. This cavity is provided with a closed enclosure 42 which is only partially represented as well as an ultrahigh vacuum ionic pump 44. The FABRY-PEROT cavity 40 comprises four independent mirrors, out of which two are plane mirrors $M_1$ and $M_2$, and two are spherical mirrors $M_3$ and $M_4$. It also includes an electron beam vacuum tube 46 traversing it on either side. The pulsed laser beam 12 is injected in the cavity 40 through the first plane mirror $M_1$, then redirected towards plane mirror $M_2$, then towards spherical mirrors $M_3$ and $M_4$ and back to plane mirror $M_1$, to then repeat the same range. The total length travelled is referred to as $L_{CAV}$.

The aim of the ABRY PEROT cavity 40 is to cause laser beam 12 interact with an electron beam propagating within the electron beam tube 46. To this end, an arrangement and an orientation of mirrors $M_1$ to $M_4$ with respect to the electron beam tube 46 is as represented on FIGS. 4a and 4b.

The centers of both planar mirrors $M_1$ and $M_2$ and of both spherical mirrors $M_3$ and $M_4$ define the vertexes of a tridimensional geometry shaped as a tetrahedron. With this configuration it is possible to stabilize the polarization of the natural modes of the FABRY PEROT cavity 40, thus, the intra cavity power. The tetrahedron shape is not necessarily smooth, so as to preserve the possibility to have different distances between the two spherical and the two planar mirrors.

To note that the precision of the positioning and of the orientation of the mirrors is essential to cause pulsed laser beam 12 interact with the electron packets. Thus, each mirror $M_1$ to $M_4$ is supported by maintaining and positioning means SM1 to SM4 independent from each other, and having various settings. Thus, each mirror $M_1$ to $M_4$ exhibits a degree of freedom in terms of rotation around an axis X and a degree of freedom in terms of rotation around a substantially perpendicular axis Y. The angular settings $\Theta x$ and $\Theta y$ make it possible to align laser beam 12 within cavity 40.

Each mirror $M_1$ to $M_4$ further exhibits a translation setting along the translation direction confounded with axis Z perpendicular to axes X and Y. the translation setting $\Delta Z$ between the two spherical mirrors $M_3$ and $M_4$ makes it possible to adjust the size of the beam, or waist, at the point of intersection with the electron beam while keeping length $L_{CAV}$ between both plane mirrors $M_1$ and $M_2$ constant. By means of a piezoelectric actuator (described later), plane mirror $M_2$ could be displaced along its optical axis by some hundreds nanometers at frequencies of a few hundreds of Hertz so as to tune the length of the optical cavity 40 with the interval between two packets of the electron beam.

According to an embodiment, it is possible to eliminate two translation settings along axis Z on one of the two plane mirrors and on one of the two spherical mirrors. A particularly advantageous solution would be to mount the piezoelectric actuator on one of the plane mirrors and the Z-axis translation means on the other plane mirror so as to avoid mechanical resonance.

Description of the Actuators

FIGS. 5a and 5b represent a cross-sectional and a perspective view of an actuator for moving mirrors $M_1$ to $M_4$. The maintaining and positioning means for maintaining and positioning mirrors $M_1$ to $M_4$ are actuated by means of twelve linear motors 50, preferably identical, encapsulated within a sealed enclosure 52 within which they operate at atmospheric pressure. Advantageously, this sealed enclosure 52 is made from stainless steel. Thus, the choice of the motor is no longer determined by its ability to operate under vacuum, but depends essentially on its mechanical characteristics and its positioning precision. Moreover, inside this enclosure 52, the use of grease between the moving parts becomes again possible. This system is developed in order to obtain a precise positioning over a stroke of about ±2 mm.

According to a preferred embodiment, the motor operates at atmospheric pressure and only the exterior of the sealed enclosure 52 contacts the ultrahigh vacuum. The mechanical pieces involved in the transmission of the movement are isolated from ultrahigh vacuum by means of bellows 54. Thus, motor 50 is fixed on a support and the part to be translated is connected to the end of bellows 54.

The part to be translated is not supported by the bellows 54, yet, it is only pushed via a point contact thanks to a ball located at the end of the motor shaft. Moreover, a return spring 56 makes it possible to counteract the force due to the vacuum and to keep a permanent point contact between the motor shaft and the part to be translated. In order to guarantee the contact quality, the ball bears on a hard steel pad. This contact may possibly be greased as it is positioned inside the sealed enclosure 52. The electrical connections of the motor are made through a sealed bushing located at the rear of the enclosure 52, from where originates a bundle 58 of individual wires, advantageously isolated by an ultrahigh vacuum Kapton sheath and provided with crimped connectors, eventually connected to the general enclosure 44 of the cavity by means of another similar sealed bushing.

Description of the Mirror Orienting Member

FIGS. 6a, 6b and 6c represent a perspective view and two right and left views of an orienting member 60 for orienting mirror $M_1$; $M_2$; $M_3$; $M_4$ which may be used to make an optical cavity according to the invention. For instance, according to an aspect of the invention, the maintaining and positioning means for maintaining and positioning mirrors $M_1$ to $M_4$ comprise an orienting member 60 for orienting mirror $M_1$; $M_2$; $M_3$; $M_4$ adopting the principle of a converging axes and central pivot dial. In this regard, mirror $M_1$; $M_2$; $M_3$; $M_4$ orienting member 60 includes 3 distinct portions, a top portion 60a, an intermediary portion 60b and a fixed portion 60c movable relative to each other through flexible hinges 64 made in a single and same mechanical piece. Flexible hinges 64 use the natural flexibility of the metal, and are obtained by creating a weakness point deformable while remaining in the elastic domain. As mentioned earlier, the rotation axes of the orienting member makes it possible to orient mirror $M_1$; $M_2$; $M_3$; $M_4$ around two directions X and Y perpendicular and converging at a crossing point 62, confounded with the center of the mirror $M_1$; $M_4$.

With this principle it is possible to perform frictionless, clearance-free relative movements between two parts. Consequently, it is particularly adapted to guarantee a precise positioning under ultrahigh vacuum.

The incidence angles of the laser beam 12 and mirrors $M_1$ to $M_4$ are relatively high as they are between 6 and 8°. The setting amplitudes of the orienting member 60 for orienting mirrors $M_1$; $M_2$; $M_3$; $M_4$ being low (±20 mrad), it is preferably convenient to provide this deviation from 6 to 8° over the mirrors orienting member 60. Thus, the offset is no longer on the means $SM_1$ to $SM_4$ for maintaining and positioning mirrors $M_1$ to $M_4$, but on orienting member 60.

FIG. 7a illustrates a carriage 66 supporting mirror $M_1$ to $M_4$ orienting member 60. Mirrors $M_1$ to $M_4$ setting around axes X and Y is made through two connecting arms 68 connected to the upper part of orienting member 60. These mirrors $M_1$ to $M_4$ are actuated by two linear motors 50 positioned in their respective sealed enclosure 52 and supported by carriage 66. The length of connecting arms 68 allows a greater precision.

FIG. 7b represents the accelerator tube 46 as seen in end view, two mirrors $M_3$, $M_4$ maintained in position by two carriages 66, as well as two connecting arms 68 each and an orienting member 60 each. As seen, in order to obtain the narrowest angle at the point of collision between laser 12 and the electron beam, it is advantageous that the spherical mirrors $M_3$, $M_4$ be positioned the closest possible to the electron beam tube 46. To this end, the maintaining and positioning means for maintaining and positioning both spherical optical reflectors $M_3$, $M_4$ have two complementary clearances 69, arranged so as to define a bay for the passage of the electron beam tube 46. Thus, both spherical optical reflectors are positioned on either side and in the vicinity of the electron beam tube.

Description of the Translation Table

The assembly composed of mirror $M_1$ to $M_4$ orienting member 60, both connecting arms 68 and both linear motors 50*a*, 50*b* actuating arms 68 is further advantageously positioned over a translation table 70 along the Z axis perpendicular to axes X and Y. Such a translation table 70 is represented by perspective and front views in FIGS. 8*a* and 8*b*.

It comprises three balls 72, a metal sheet 74, two rails 76 and two supporting elements 78. The three balls 72 define a plane and provide a good prestressing-free stability. Two balls 72 out of the three roll between rails 74 and provide the translation direction, whereas the third ball 72 defines the translation plane. The displacement of supporting elements 78 is integrally made by frictionless rolling. The three balls 72 move at the same speed and a fine metal sheet 74 makes it possible to determine and maintain a spacing therebetween.

Rails 76 are made from stainless steel and balls 72 may advantageously be made from the following materials: ceramics, ruby or stainless steel. If made from stainless steel as for the rails 76, then these balls must be processed through molybdenum disulphide scaling so as to avoid microbonding phenomena. The holding together of the two parts and the guiding efficiency is made possible thanks to the weight of the element to be displaced. The center of gravity of the element to be displaced is positioned as low as possible and located the as close as possible to that of the triangle formed by the three balls.

FIG. 9 represents a perspective view of a translation table 70 mounted on a main support 80 and on which are disposed upper carriage 60, mirror orienting member 60, both motors 50 encapsulated within a sealed enclosure 52 for positioning around axes X and Y as well as a linear motor 50 also encapsulated within an enclosure 52 so as to allow the translation displacement of carriage 66 along axis Z. The assembly of the construction and the use of motors 50 encapsulated makes it possible to mount the four mirrors, with their independent settings, over main support 80 which becomes the only part contacting enclosure 42. This main support 80 connected to enclosure 42 by three very rigid points makes it possible to guarantee the geometrical stability between the four mirrors $M_1$ to $M_4$ of the cavity. With this construction it is also possible to isolate the cavity from external vibrations by restricting at the most the contact points with the enclosure. Thanks to the motors 50 it is also possible to adjust a distance from the cavity during the accelerator functioning.

The Z-axis positioning motors are mounted over an Invar support (a 64% Iron and 36% Nickel alloy) of which thermal expansion coefficient is very low (2.69 μm/° C.) makes it possible to minimize the feedback-controls required to keep this length constant. Advantageously, these parts are made in a single mechanical piece so as to minimize the number of assemblies. Furthermore, the parts are voluntarily bulky so as to increase their inertia and limit the vibration propagation. To note that the length of the cavity, referred to as $L_{CAV}$, is equal to the distance travelled by the laser between the four mirrors, that is, 1679.5 mm.

Description of the Mirror Support Element with PZT

In order to obtain a feedback-control between the cavity length and the distance between two electron packets, it is required to displace the lens of at least one of the plane mirrors $M_1$ or $M_2$ on its optical axis. With regard to a mirror M1 or M2 having a diameter of 25.4 mm and a thickness of 6 mm, the displacement to make is of about some hundreds of nanometers at frequencies of some hundreds of Hertz.

Figure 10:
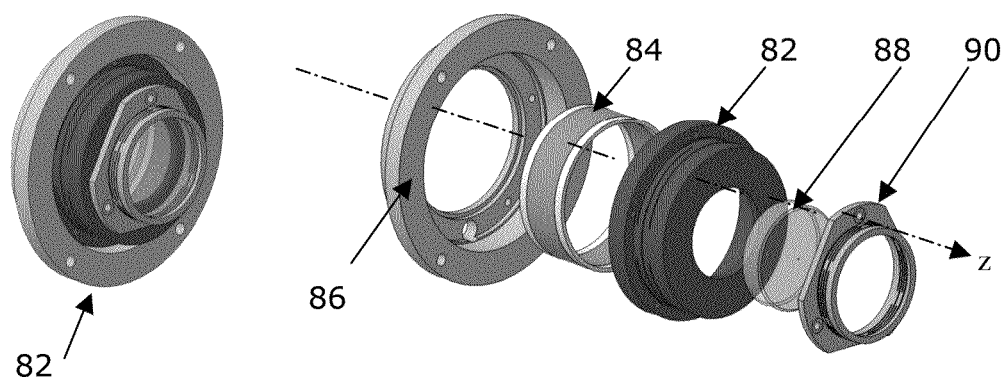
FIG. 10 illustrates two perspective views, one of which being an exploded view, of a support element for supporting a plane mirror M1; M2 belonging to an optical cavity according to the invention.

FIG. 10 illustrates two perspective views, one of which being an exploded view, of an exemplary embodiment of a plane mirror $M_1$; $M_2$ supporting element 82 comprising a piezoelectric actuator 84. Advantageously, this supporting element 82 includes successively, a rear supporting element 86, the piezoelectric actuator 84, a piezoelectric actuator 84 prestressing ring 88, a plane mirror $M_1$; $M_2$ and a spring ring 90. It is advantageous to incorporate the piezoelectric actuator 84 on the means $SM_1$; $SM_2$ for maintaining and positioning this plane mirror $M_1$; $M_2$ so as to manage, with the required precision, the displacement of the plane mirror $M_1$; $M_2$ along the lens optical axis. Moreover, the spring ring 90 has mechanical characteristics affording it to deform when the three fixing screws are clamped. A precise mechanical calculation makes it possible to apply on the mirror, when the clamping is at its maximum (which further avoids loosening), a given holding stress, relating to the geometry of the flexible parts and to the mirror thickness.

In order to obtain the prestress over the piezoelectric actuator 84, the same principle is used, involving, in this case, the prestressing ring 88 and the rear support 86. The plane mirror $M_1$; $M_2$ is fixed on the front of the prestressing ring 88 and the rear support 86 also allows the fixing of the supporting element 82 on the mirror $M_1$, $M_2$ orienting member. Such a configuration is advantageous in that the fixing of mirror $M_1$; $M_2$ is rigid such that it perfectly follows the movement, yet without a too great stressing force to avoid birefringence optical phenomena. It also allows the integration of the supporting element 82 on the mirror orienting member 48 while minimizing the weight of the moving parts so as to achieve the desired frequencies and amplitudes.

The invention is not limited to the described and represented exemplary embodiments. For instance, the cavity may be used with other time periods, up to the femtosecond.

The invention claimed is:

1. An amplifying optical cavity of the FABRY-PEROT type for producing monochromatic X-rays through a COMPTON reaction of a high-rate picoseconds pulsed laser beam with a synchronized electron beam, the cavity comprising a closed enclosure operably being vacuumed, traversed by an electron beam tube, the enclosure comprising a laser, at least a first actuator operably maintaining and positioning two plane optical reflectors, and at least a second actuator operably maintaining and positioning two spherical optical reflectors operably focusing the laser beam at a point of interaction with the electron beam, wherein the optical reflectors are arranged by the first and second actuators such that the optical reflectors substantially define the vertexes of a tetrahedron.

2. An amplifying optical cavity according to claim 1, wherein the spherical optical reflectors second actuator has two complementary clearances, arranged so as to define a bay for the passage of the electron beam tube.

3. An amplifying optical cavity according to claim 1, wherein at least one of the actuators comprise an orienting member for orienting the associated reflector made from a single mechanical piece, including at least three distinct portions, movable with respect to each other, by flexible hinges.

4. An amplifying optical cavity according to claim 3, wherein the three distinct portions of the orienting member are movable around two rotation axes converging at one point substantially confounded with the optical center of the reflector.

5. An amplifying optical cavity according to claim 1, wherein at least one of the actuators is actuated by linear electric motors encapsulated within a sealed enclosure made of stainless steel and extended by a bellows.

6. An amplifying optical cavity according to claim 5, wherein the linear electric motors are kept in permanent contact with respect to the at least one actuator by a spring element which generates a return force.

7. An amplifying optical cavity according to claim 1, wherein at least one of the actuators has a Z-axis translation table, the translation table supporting two linear electric motors capable of actuating the reflector orienting member.

8. An amplifying optical cavity according to claim 1, wherein at least one of the actuators has a piezoelectric actuator oriented along the direction of the reflector optical axis and maintained in position by a spring ring.

9. An amplifying optical cavity according to claim 1, wherein all of the actuators are positioned on a main support, the main support being the only piece contacting the closed enclosure.

10. A system for producing monochromatic X-rays through a COMPTON reaction, comprising an amplifying, FABRY-PEROT optical cavity comprising a high-rate picoseconds pulsed laser beam with a synchronized electron beam, the cavity comprising a closed enclosure operably being vacuumed, traversed by an electron beam tube, the enclosure comprising a laser, at least a first actuator operably maintaining and positioning two plane optical reflectors, and at least a second actuator operably maintaining and positioning two spherical optical reflectors operably focusing the laser beam at a point of interaction with the electron beam, wherein the optical reflectors are arranged by the first and second actuators such that the optical reflectors substantially define the vertexes of a tetrahedron.

* * * * *